United States Patent [19]

Lückow et al.

[11] Patent Number: 4,611,751
[45] Date of Patent: Sep. 16, 1986

[54] METHOD AND APPARATUS FOR THE MANUFACTURE OF CYLINDRICAL HOLLOW BODIES

[75] Inventors: Herbert Lückow; Ulrich Plantikow, both of Dusseldorf; Siegfried Gröne, Witten-Annen, all of Fed. Rep. of Germany

[73] Assignee: Thyssen Aktiengesellschaft, Fed. Rep. of Germany

[21] Appl. No.: 570,050

[22] Filed: Jan. 11, 1984

[30] Foreign Application Priority Data

Jan. 12, 1983 [DE] Fed. Rep. of Germany ........ 3300827

[51] Int. Cl.$^4$ .......................... B23K 9/04; B23K 37/04
[52] U.S. Cl. ..................................... 228/184; 228/48; 219/160
[58] Field of Search ............... 228/184, 48, 17.5, 17.7, 228/145; 219/76.1, 160, 159; 242/7.22, 78, 78.1; 152/42, 48, 49, 69, 73, 93

[56] References Cited

U.S. PATENT DOCUMENTS

| 379,937 | 3/1888 | Coas | 228/145 X |
| 946,112 | 1/1910 | Cooper | 152/73 |
| 1,103,398 | 7/1914 | Cooper | 152/73 X |
| 1,252,456 | 1/1918 | Lenske | 152/69 |
| 1,409,290 | 3/1922 | Gareis | 152/69 |
| 1,451,517 | 4/1923 | Smith | 152/73 X |
| 2,359,446 | 10/1944 | Scudder | 228/184 X |
| 3,549,077 | 12/1970 | Huck | 228/145 X |
| 4,201,326 | 5/1980 | Connell | 219/160 X |
| 4,479,602 | 10/1984 | Fernandez et al. | 228/48 |

FOREIGN PATENT DOCUMENTS 1137742 12/1982 Canada ..................... 32/83

Primary Examiner—Nicholas P. Godici
Assistant Examiner—Carmine Cuda
Attorney, Agent, or Firm—Sprung Horn Kramer & Woods

[57] ABSTRACT

The invention comprises a method and an apparatus for the manufacture of cylindrical hollow bodies by the shape welding process. This apparatus comprises a connection between a rotatably mounted supporting body which can be driven and a base body onto which the weld material is deposited. This connection is effected by elastically deformable elements and is capable of changing in the radial direction. Metal profiles which can be deformed elastically are fastened, in a manner permitting detachment, to the periphery of the supporting body, spaced at regular intervals. The base body is composed of a metal sheet or strip which is wrapped around the profiles and attached to them in a manner permitting detachment. Preferably the profiles extend over the length of the supporting body. The deformable metal profiles may be designed as cylindrical tubes, without any discontinuities or as half-tubes, angle-profiles, Z-profiles, or corrugated-sheet profiles.

11 Claims, 9 Drawing Figures

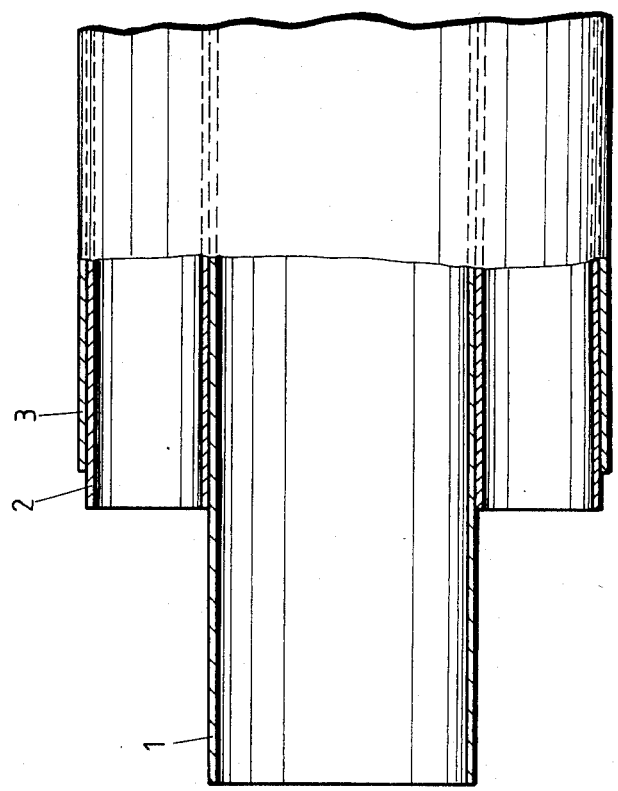
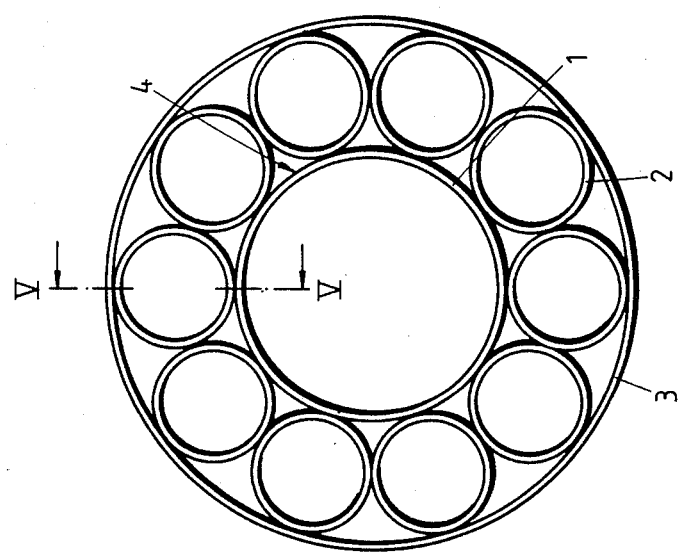
Fig.1
Fig.2

METHOD AND APPARATUS FOR THE MANUFACTURE OF CYLINDRICAL HOLLOW BODIES

BACKGROUND OF THE INVENTION

The invention relates to an apparatus for the manufacture of cylindrical hollow bodies by means of the shape welding process, this apparatus comprising a connection between a rotatably mounted supporting body which can be driven and a base body onto which the weld material is deposited, this connection, which is effected by means of elastically deformable elements, which are capable of changing in the radial direction.

By the shape welding process, cylindrical hollow bodies are built-up layer by layer, each layer being formed by deposition of molten metal by welding along neighboring tracks which together cover the area of the base body. The weld deposition of the metal may be effected by a welding head, which is moved longitudinally along the body, and if the body is simultaneously axially rotated the metal is deposited along a helical path in forming a layer. A plurality of welding heads may be used so that metal is deposited simultaneously at different positions during the construction of each layer.

It has been found that such weld deposition of metal satisfies high standards, particularly if the layers are generated on the axially rotating body by a powder shielded welding process During the manufacture of cylindrical hollow bodies by the shape welding process shrinkage stresses in the deposited metal occur. There are some proposals to prevent denting or bending of the base body as a result of the shrinkage stresses.

German Pat. No. 3,029,686 discloses an apparatus comprising a connection between a rotatably mounted supporting body and a base body which is capable of changing in the radial direction. This connection is composed of elastically compliant shrinkage elements. The shrinkage elements are designed, in particular, as U-shaped spring elements which possess U-legs parallel to the axis, and which are arranged in the interspace between the supporting body and the base body, spaced from one another at distances which can be selected in both the peripheral and axial directions.

This apparatus enables uniform absorption of the shrinkage stresses to be achieved, these stresses occurring during the manufacture of cylindrical hollow bodies by means of the shape welding process. The elastically compliant shrinkage-elements absorb the shrinkage stresses, but it is not always possible to prevent the supporting body from being subjected to certain deformations. However, changes in the circular shape or diameter variations over the length of the hollow body which is manufactured do not, in general, occur.

In the case of this known apparatus, it is, however, necessary that the elastically compliant shrinkage elements be securely welded both to the supporting body and to the base body. In consequence, the removal of the supporting body from the finished hollow body is possible only by means of a procedure involving damage to the supporting body so that it cannot easily be re-used for the manufacture of further hollow bodies.

A further disadvantage resides in the fact that it is impossible to adapt the apparatus to suit base bodies possessing different internal diameters, so that it is invariably necessary to build a separate apparatus for each diameter. A further cost increase is associated with this problem.

German Pat. No. 2,850,721 discloses an apparatus which can be used repeatedly, and which is also independent of the diameter of the base body employed on any particular occasion. In this apparatus, the radially shiftable connection between the rotatably mounted supporting body, which is driven, and the base body is formed by supporting members which are equipped with a spindle drive in order to enable them to be shifted radially. By this means, it is possible to effect an adjustment to suit different diameters of hollow bodies which have to be produced. However, when using this known apparatus, it is impossible to achieve the absorption of the shrinkage stresses which occur during the shape welding process. When an apparatus of the above-mentioned type is employed, it has been found that the spindle drives have even been destroyed by the shrinkage stresses which occur.

SUMMARY OF THE INVENTION

The object underlying the invention is to provide an apparatus which enables uniform absorption of the shrinkage stresses to be achieved, and which possesses a rotatably-mounted supporting body which can be re-used, it being possible both to drive this supporting body and to adapt it to suit different internal diameters of the hollow bodies which are to be manufactured.

This object is achieved in accordance with the invention by an apparatus for the manufacture of cylindrical bodies by means of the shape welding process comprising a rotatably mounted supporting body connected to a base body via a connection onto which base body weld material is deposited. The connection comprises elastically deformable elements. In accordance with the invention, such connections have metal profiles which can be deformed elastically and are detachably fastened to the periphery of the supporting body and are disposed about said supporting body at regular intervals. The apparatus is further improved in that the base body comprises a metal sheet or strip arranged around the profiles and detachably secured thereto.

The profiles preferably extend over the entire length of the supporting body. In a preferred form, the profiles are in the form of cylindrical tubes free of discontinuities. Alternatively the profile can be in the form of half-tubes i.e., semi-cylindrical tubes, or they can have angle profiles, Z-profiles or corrugated sheet profiles.

In a preferred embodiment of the invention, in order to change the diameter of the supporting body, at least one distance plate, preferably a plurality of distance plates, is disposed on the periphery of said supporting body and the metal profiles are detachably fastened to the periphery of the distance plate.

The advantages which are obtained by means of the apparatus according to the invention amount to the fact that the deformable metal profiles uniformly absorb the shrinkage stresses which occur during the shape welding process. Furthermore, the fact that the profiles are fastened to the supporting body in a manner permitting detachment enables the latter to be removed from the hollow body, once it has been finished, without it suffering damage. Since the profiles are arranged on the periphery of the supporting body in a manner such that they are spaced at regular intervals, and since they preferably extend over the entire length of the supporting body, the shrinkage stresses which occur during the shape welding process are, in practical term, prevented from causing deformation of the supporting body. In consequence, no problems arise in re-using the supporting body.

Furthermore, the fact that the profiles are fastened to the base body in a manner permitting their detachment enables them, after deformation, and after completion of the manufacture of the hollow body, to be removed from the latter without difficulties.

A further advantage resides in the adaptation of the apparatus to different internal diameters of the hollow bodies which are to be manufactured. This adaptation can be effected, on the one hand, by using metal profiles with differing radial dimensions, in particular by using cylindrical tubes, without discontinuities, half-tubes, angle-profiles, Z-profiles, or corrugated-sheet profiles, with dissimilar diameters or radial dimensions, as the case may be, while, on the other hand, this adaptation can be effected by reference to the periphery of the supporting body, on which the metal profiles are fastened in a manner permitting detachment.

BRIEF DESCRIPTION OF DRAWINGS

In the following text, the invention is described by reference to two examples which are represented in the drawing, and further advantages are explained. In the drawings:

FIG. 1 shows a first embodiment of the apparatus according to the invention, in end elevation, while FIG. 2 shows the apparatus shown in FIG. 1, but in side elevation, partially sectioned in the axial direction, FIG. 3 shows a second embodiment of the fixture according to the invention, in end elevation, while

DESCRIPTION OF SPECIFIC EMBODIMENT

Figure 4:
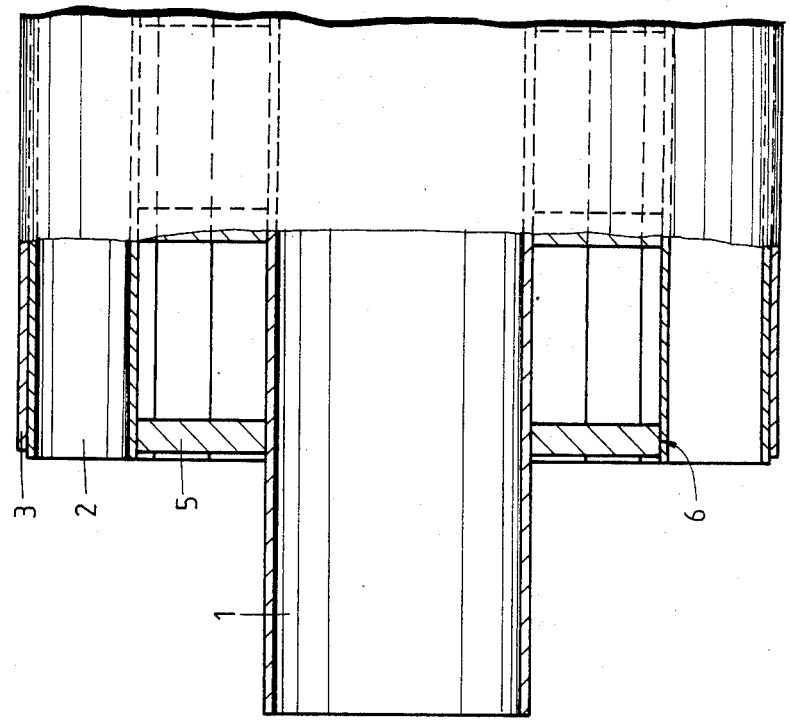
FIG. 4 shows the apparatus shown in FIG. 3, but in side elevation, partially sectioned in the axial direction.

The apparatus shown in FIGS. 1 and 2 possesses a cylindrical supporting body 1, which is rotatably mounted at its ends, in a manner which is not represented. A drive mechanism for rotating the supporting body 1 is likewise omitted from the drawing. Deformable metal profiles are arranged on the periphery of the supporting body 1, these profiles being in the form of cylindrical tubes, without discontinuities. The tubes, which are without discontinuities, extend over the entire length of the supporting body 1, and are fastened to its periphery 4 by means of individual spot-welds. The fastening can also be effected by other methods, for example by means of retaining bands, or by means of bolted connections which can be unfastened. A steel strip is wound, in the form of a spiral, around the tubes, which are without discontinuities, this steel strip likewise being fastened to them by means of individual spot-welds. Instead of the spirally-wound steel strip, it is also possible to wrap a piece of sheet steel around the tubes without discontinuities. The steel strip forms the base body 3 of the apparatus, onto which base body the weld material is deposited during the shape welding process, this process employing welding heads which are not represented.

The tubes, which are without discontinuities, uniformly absorb the deformations which occur, as a result of welding stresses, during the welding process which produces the finished shape. The geometry of the base body 3 changes in accordance with the deformation of the tubes which are without discontinuities, while the geometry of the supporting body 1 remains unchanged. Following completion of the manufacture of the hollow body, by means of a welding process which produces the finished shape, it is possible, after severing the spot-welds, to pull the supporting body 1 out of the hollow body, after which it can be re-used. After severing the remaining spot-welds, or other attachment means, the deformed tubes, which are without discontinuities, can be pulled out of the hollow body which has been produced, and which can be supplied to further processing stations.

Figure 3:
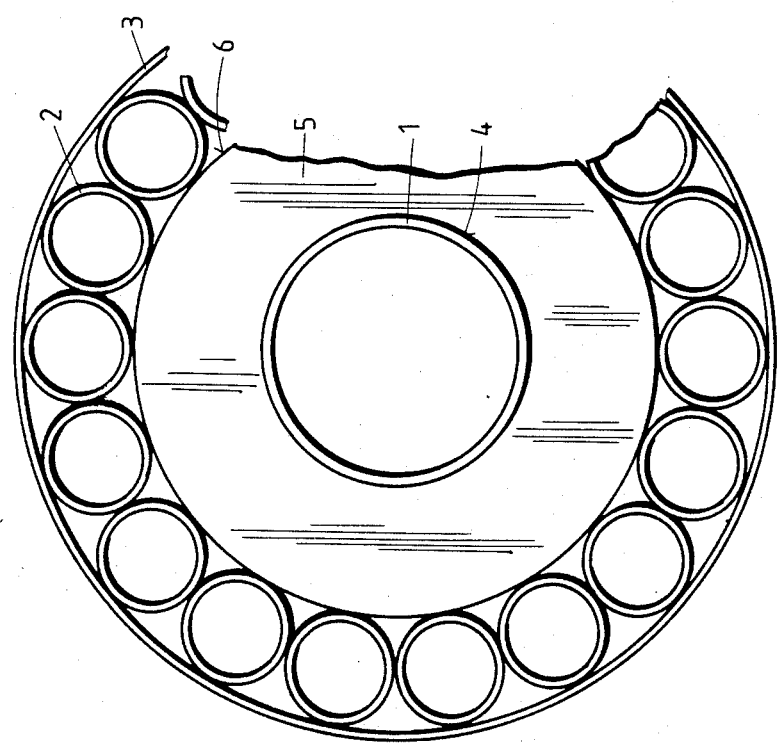
Figure 6:
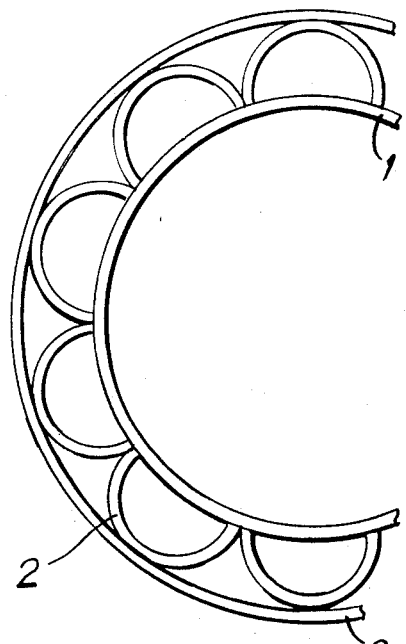
Figure 7:
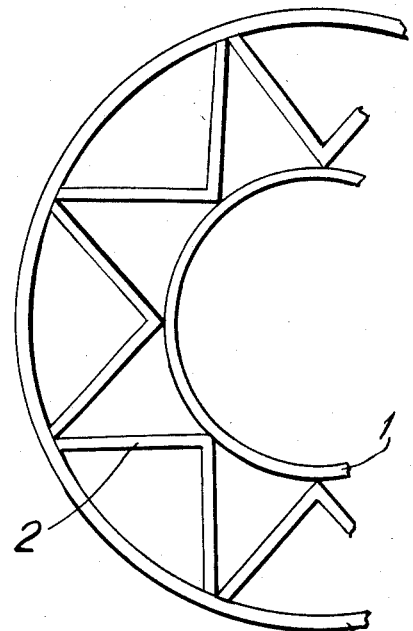
Figure 8:
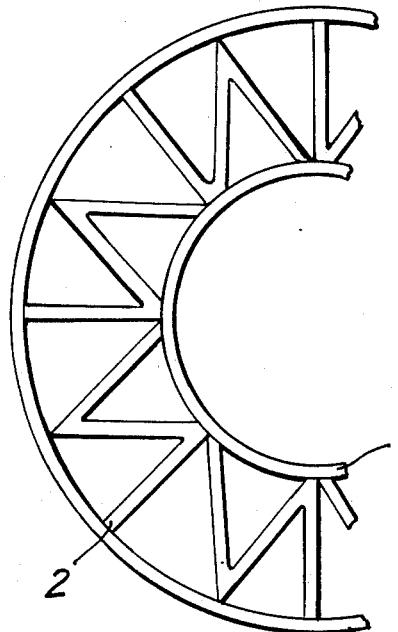
Figure 9:
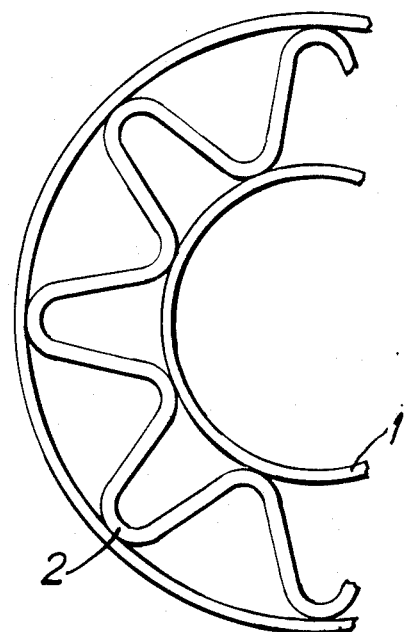

In the same way, the apparatus shown in FIGS. 3 and 4 possesses a supporting body 1 which is mounted, at its ends, in a manner which permits it to be rotated and driven. the method of mounting being omitted from the representation. A drive mechanism for rotating the supporting body 1 is likewise omitted from the drawing. Distance plates 5 are arranged on the periphery 4 of the supporting body 1, spaced at regular intervals, these distance plates 5 being fastened to the periphery of the supporting body by means of fastening means which are not represented. Deformable metal profiles 2 are fastened on the periphery 6 of the distance plates 5, these profiles l being in the form of cylindrical tubes, without discontinuities. Instead of the cylindrical tubes, without discontinuities, it is also possible, in the case of this embodiment of the apparatus according to the invention, to use other suitable deformable metal profiles including semi-cylindrical tubes shown in FIG. 6, angle profiles shown in FIG. 7, Z-profiles shown in FIG. 8 or corrugated sheet profiles shown in FIG. 9.

The tubes without discontinuities extend over the length of the supporting body 1, and are fastened to the periphery 6 of several distance plates 5, or to the peripheries of all of them, by means of individual spot-welds. The attachment can also be effected by other methods, for example, by means of retaining bands, or by means of bolted connections which can be unfastened. A steel strip is wound, in the form of a spiral, around the tubes, which are without discontinuities, this steel strip likewise being fastened to them by means of individual spot-welds. Instead of the spirally-wound steel strip, it is also possible to wrap a piece of sheet steel around the tubes without discontinuities. Once again, the steel strip forms the base body 3 of the apparatus, onto which base body the weld material is deposited during the shape welding process this process employing welding heads which are not represented.

The tubes which are without discontinuities uniformly absorb the deformations which are caused by the welding stresses during the welding process which produces the finished shape, while the geometry of the supporting body 1 and of the distance plates 5 remains unchanged. The geometry of the base body 3 changes in accordance with the deformation of the profiles 2. Following completion of the manufacture of the hollow body by means of the shape welding process it is possible, after severing the spot-welds, to pull the supporting body 1, with the distance plates 5, out of the hollow body. Should it thereafter be desired to produce a hollow body possessing the same internal diameter as the hollow body which has been manufactured, it is possible to re-use the supporting body, with the distance plates, without any difficulty. Should, on the other hand, it be intended to produce a hollow body possessing another diameter, the distance plates which have been used are removed from the supporting body and are replaced by other distance plates which are available from storage. After severing the remaining spot-welds, the deformed tubes, which are without discontinuities, can be pulled out of the hollow body. The hollow body which has been produced can then be supplied to the further processing stations.

Figure 5:
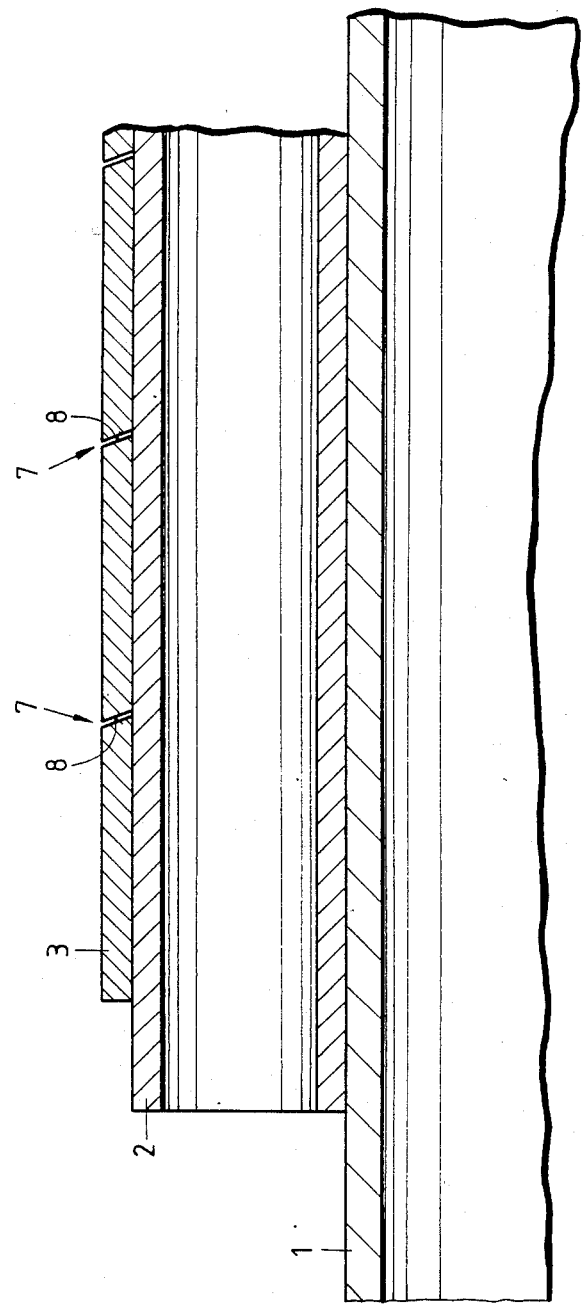
FIG. 5 shows a section along the line V—V in FIG. 1 and FIGS. 6–9 show alternative profiles according to the invention.

As FIG. 5 shows, the steel strip which is wrapped, in the form of a spiral, around the tubes, which are without discontinuities, possesses chamfered-off areas 8 at the longitudinal edges 7. These areas overlap when the steel strip is in the wound state. Designing the longitudinal edges in this manner prevents molten weld material from penetrating between the longitudinal edges during the deposition of the weld-beads onto the base body 3. The advantage thus resides in the fact that it is unnecessary to weld the longitudinal edges 7 of the steel strip together in order to manufacture the base body 3, which would be an expensive operation. Instead of chamfering-off the longitudinal edges, it is also possible to use other shapes which bring about overlapping when the steel strip is in the wound-up state, such as, for example, stepped shapes.

What is claimed is:

1. In an apparatus for the manufacture of cylindrical hollow bodies by the shape welding process which apparatus comprises a rotatably mounted supporting body which can be driven and which is adapted to support a base body onto which the weld material in deposited, said base body connected to said rotatably mounted supporting body by a connector which comprises at least one elastically deformable element, the improvement wherein said connector comprises a plurality of elastically deformable elongated metal profiles, each profile extending over the length of the supporting body and detachably fastened to the periphery of said supporting body so as to be detached in one piece for easy removal and wherein the profiles are disposed about said supporting body at regular spaced intervals and said base body is composed of a metal sheet or strip wrapped about said profiles for resilient support and detachably secured thereto.

2. An apparatus according to claim 1, wherein each said deformable metal profile is in the form of a cylindrical tube.

3. An apparatus according to claim 2, wherein said cylindrical tube is free of discontinuities.

4. An apparatus according to claim 1, wherein each said deformable metal profile is in the form of a semi-cylindrical tube.

5. An apparatus according to claim 1, wherein each said deformable metal profile has an angle profile.

6. An apparatus according to claim 1, wherein said metal profile has a Z profile.

7. An apparatus according to claim 1, wherein said metal profile has a corrugated sheet profile.

8. An apparatus according to claim 1, wherein further comprising at least one distance plate disposed against the periphery of said supporting body and detachably secured thereto, said distance plate also detachably secured at its periphery to said metal profile whereby the diameter of the supporting body can be changed from one welding process to another by selecting different size distance plates.

9. An apparatus according to claim 1, wherein said base body is composed of a steel strip which is spirally wound about said deformable metal profiles to which it is detachably secured.

10. An apparatus according to claim 9, wherein said steel strip has chamfered off areas at its longitudinal edges such that these chamfered off areas overlap one another when the steel strip is in the wound state.

11. In a method for the manufacture of cylindrical hollow bodies by the shape welding process wherein a supporting body is rotated with a connected base body onto which weld material is deposited, the improvement comprising detachably connecting the base body to the supporting body with a plurality of elastically deformable elongated metal profiles with each running the length of the supporting body by detachably fastening the profiles to the periphery of said supporting body such that each profile is detachable in one piece for easy removal and disposing the profiles about said supporting body at regular spaced intervals and providing the base body in the form of a metal sheet or strip and wrapping the base body about said profiles for resilient support and detachably securing the base body to the profiles.

* * * * *